United States Patent
Lowe et al.

(10) Patent No.: US 7,765,593 B1
(45) Date of Patent: Jul. 27, 2010

(54) RULE SET-BASED SYSTEM AND METHOD FOR ADVANCED VIRUS PROTECTION

(75) Inventors: Joseph C. Lowe, Aloha, OR (US); Jonathan L. Edwards, Portland, OR (US); Andrew A. Woodruff, Portland, OR (US); Joel R. Spurlock, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 378 days.

(21) Appl. No.: 10/876,524

(22) Filed: Jun. 24, 2004

(51) Int. Cl.
*G06F 12/14* (2006.01)
*G06F 7/04* (2006.01)
*G06F 11/30* (2006.01)
*G06F 15/16* (2006.01)
*G06F 15/173* (2006.01)
*H04L 29/06* (2006.01)
*H04L 9/32* (2006.01)

(52) U.S. Cl. .............. 726/22; 726/3; 726/23; 726/24; 726/25; 713/151; 713/165; 713/168; 713/188; 713/189; 709/217; 709/225

(58) Field of Classification Search .............. 713/200, 713/151, 165, 168, 188, 189; 726/24, 3, 726/22–25; 709/217, 225
See application file for complete search history.

(56) References Cited

U.S. PATENT DOCUMENTS

| | | | | |
|---|---|---|---|---|
| 5,606,668 A * | 2/1997 | Shwed | .................. | 726/13 |
| 5,623,600 A * | 4/1997 | Ji et al. | .................. | 726/24 |
| 5,889,943 A * | 3/1999 | Ji et al. | .................. | 713/201 |
| 5,956,481 A | 9/1999 | Walsh et al. | .................. | 395/186 |
| 5,964,889 A * | 10/1999 | Nachenberg | .................. | 714/25 |
| 5,974,549 A * | 10/1999 | Golan | .................. | 726/23 |
| 5,983,348 A * | 11/1999 | Ji | .................. | 726/13 |
| 5,987,135 A * | 11/1999 | Johnson et al. | .................. | 709/224 |
| 6,123,737 A * | 9/2000 | Sadowsky | .................. | 717/173 |
| 6,219,786 B1 * | 4/2001 | Cunningham et al. | .................. | 713/152 |
| 6,266,707 B1 * | 7/2001 | Boden et al. | .................. | 709/245 |
| 6,311,277 B1 * | 10/2001 | Takaragi et al. | .................. | 726/6 |
| 6,460,050 B1 * | 10/2002 | Pace et al. | .................. | 707/104.1 |
| 6,473,896 B1 * | 10/2002 | Hicken et al. | .................. | 717/132 |
| 6,594,686 B1 | 7/2003 | Edwards et al. | .................. | 709/203 |
| 6,611,925 B1 | 8/2003 | Spear | .................. | 714/38 |
| 6,779,118 B1 * | 8/2004 | Ikudome et al. | .................. | 713/201 |
| 6,954,858 B1 * | 10/2005 | Welborn et al. | .................. | 726/24 |
| 7,080,408 B1 * | 7/2006 | Pak et al. | .................. | 726/24 |

(Continued)

FOREIGN PATENT DOCUMENTS

EP     1 357 499     10/2003

OTHER PUBLICATIONS

Related U.S. Appl. No. 10/876,523, which was filed Jun. 24, 2004.

(Continued)

*Primary Examiner*—Aravind K Moorthy
(74) *Attorney, Agent, or Firm*—Zilka-Kotab, PC

(57) ABSTRACT

A system, method and computer program product are provided for preventing malware infection. In use, mass-mailing-type malware is prevented from sending electronic messages via a network. Malware is also prevented from communicating. Still yet, unrecognized attachments are prevented from opening, and executable files are prevented from being infected via the network.

42 Claims, 5 Drawing Sheets

U.S. PATENT DOCUMENTS

| | | | |
|---|---|---|---|
| 7,216,367 B2 | 5/2007 | Szor | 726/25 |
| 7,415,727 B1 | 8/2008 | Lowe et al. | 726/24 |
| 2002/0091940 A1* | 7/2002 | Welborn et al. | 713/201 |
| 2003/0023875 A1 | 1/2003 | Hursey et al. | 713/201 |
| 2003/0065926 A1 | 4/2003 | Schultz et al. | 713/188 |
| 2004/0168070 A1 | 8/2004 | Szor | |
| 2004/0210640 A1* | 10/2004 | Chadwick et al. | 709/207 |
| 2005/0166001 A1 | 7/2005 | Conover et al. | 711/100 |
| 2008/0134335 A1* | 6/2008 | Kameda | 726/24 |
| 2008/0196104 A1* | 8/2008 | Tuvell et al. | 726/24 |
| 2009/0019388 A1* | 1/2009 | Zhang et al. | 715/772 |
| 2009/0031162 A1* | 1/2009 | Bose et al. | 714/2 |
| 2009/0141652 A1* | 6/2009 | Canright et al. | 370/254 |

OTHER PUBLICATIONS

Office Action Summary from U.S. Appl. No. 10/876,523 which was mailed on Feb. 3, 2006.
Advisory Action from U.S. Appl. No. 10/876,523 which was mailed on Apr. 12, 2006.
Examiner's Answer from U.S. Appl. No. 10/876,523 mailed Nov. 1, 2006.
Office Action Summary from U.S. Appl. No. 10/876,523 which was mailed on Sep. 21, 2005.
Russinovich, Mark, "Windows NT System Management: A Collection of Topics"Jun. 1998. 29 Street Press. pp. 1-16.
Notice of Allowance from U.S. Appl. No. 10/875,523 mailed on Oct. 30, 2007.
Decision on Appeal from U.S. Appl. No. 10/876,523 which was decided on Jul. 27, 2007.

* cited by examiner

RULE SET-BASED SYSTEM AND METHOD FOR ADVANCED VIRUS PROTECTION

RELATED APPLICATION(S)

The present application is related to a application entitled "SYSTEM, METHOD, AND COMPUTER PROGRAM PRODUCT FOR TAILORING SECURITY RESPONSES FOR LOCAL AND REMOTE FILE OPEN REQUESTS" which was filed coincidentally herewith under Ser. No. 10/876,523, naming inventors Lowe, Edwards, and Kumar, and which is incorporated herein by reference.

FIELD OF THE INVENTION

The present invention relates to network security, and more particularly to preventing viruses from infecting computers.

BACKGROUND OF THE INVENTION

In the space of just a few years, the Internet, because it provides access to information, and the ability to publish information, in revolutionary ways, has emerged from relative obscurity to international prominence. Whereas, in general, an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. As experience has shown, the frontier of cyberspace has its share of scofflaws, resulting in increased efforts to protect the data, resources, and reputations of those embracing intranets and the Internet.

Security threats have evolved significantly with the increased popularity of the Internet. Advanced hybrid threats have been designed to attack systems on multiple fronts, sometimes searching for vulnerabilities until one is found. New threats also attempt to attack security technology itself.

Further, recent viruses use several techniques in order to spread very rapidly. In the time it takes for virus researchers to obtain a sample, analyze it, and release new signature files (i.e. DAT files, etc.), and for customers to obtain those signature files and distribute them to their computers; the virus can infect many, many computers.

One problem, therefore, involves protecting computers from new threats in this short period of time. Since no one knows when a new virus will be released and be successful, it is necessary for this protection to not cause any other problems.

Several years ago, technologies such as behavior blocking and file check summing were proposed as solutions to this problem, but they fell out of favor. This is because behavior blocking was not tuned enough to differentiate between legitimate and malicious behavior. Moreover, check summing fell out of favor because the advent of macro viruses meant that it became impossible to distinguish legitimate changes from malicious ones.

There is thus a need for overcoming these and other related security problems.

SUMMARY OF THE INVENTION

A system, method and computer program product are provided for preventing malware infection. In use, mass-mailing-type malware is prevented from sending electronic messages via a network. Malware is also prevented from communicating. Still yet, unrecognized attachments are prevented from opening, and executable files are prevented from being infected via the network.

In one embodiment, the mass-mailing-type malware may be capable of sending a multiplicity of electronic messages to a multiplicity of recipients. In use, the mass-mailing-type malware may be prevented from sending electronic messages by preventing use of a predetermined port. This predetermined port may include port 25.

As an option, the mass-mailing-type malware may be prevented from sending electronic messages by utilizing a white list for conditionally preventing the sending of electronic messages based on a predetermined aspect. For example, such a predetermined aspect may include a recipient address, an application identifier, etc.

In another embodiment, the malware may be prevented from communicating by preventing communications over predetermined communication channels. Such predetermined communication channels may include a file transfer protocol (FTP), a hypertext transfer protocol (HTTP), an internet relay chat (IRC) protocol, etc.

In yet another embodiment, the malware may be prevented from communicating by utilizing a white list for conditionally preventing the communication based on a predetermined aspect. As an example, the predetermined aspect may be an application identifier, etc.

Optionally, the opening of unrecognized attachments may be prevented by preventing the opening of the unrecognized attachments when they reside in a temporary directory. The prevention of the opening of the unrecognized attachments may further be subject to user tuning. For example, such user tuning may involve limiting the prevention of the opening of the unrecognized attachments to situations where the unrecognized attachments are received via a web page or via an electronic message.

In a further embodiment, executable files may be prevented from being infected via the network by determining whether a request to open the executable files is a local request or a remote request. In this embodiment, the executable files may be prevented from being infected by conditionally allowing the opening thereof based on whether the request is the local request or the remote request.

In still yet another embodiment, a system, method and computer program product are provided for defining a rule to prevent malware infection. In this embodiment, a rule is identified, and a process and at least one file or directory are selected to which the rule is to be applied. Further, at least one action is chosen that triggers the rule to be applied to the selected process and the at least one file or directory. Still yet, an operation is chosen to be carried out in response to the action.

DETAILED DESCRIPTION

Figure 1:
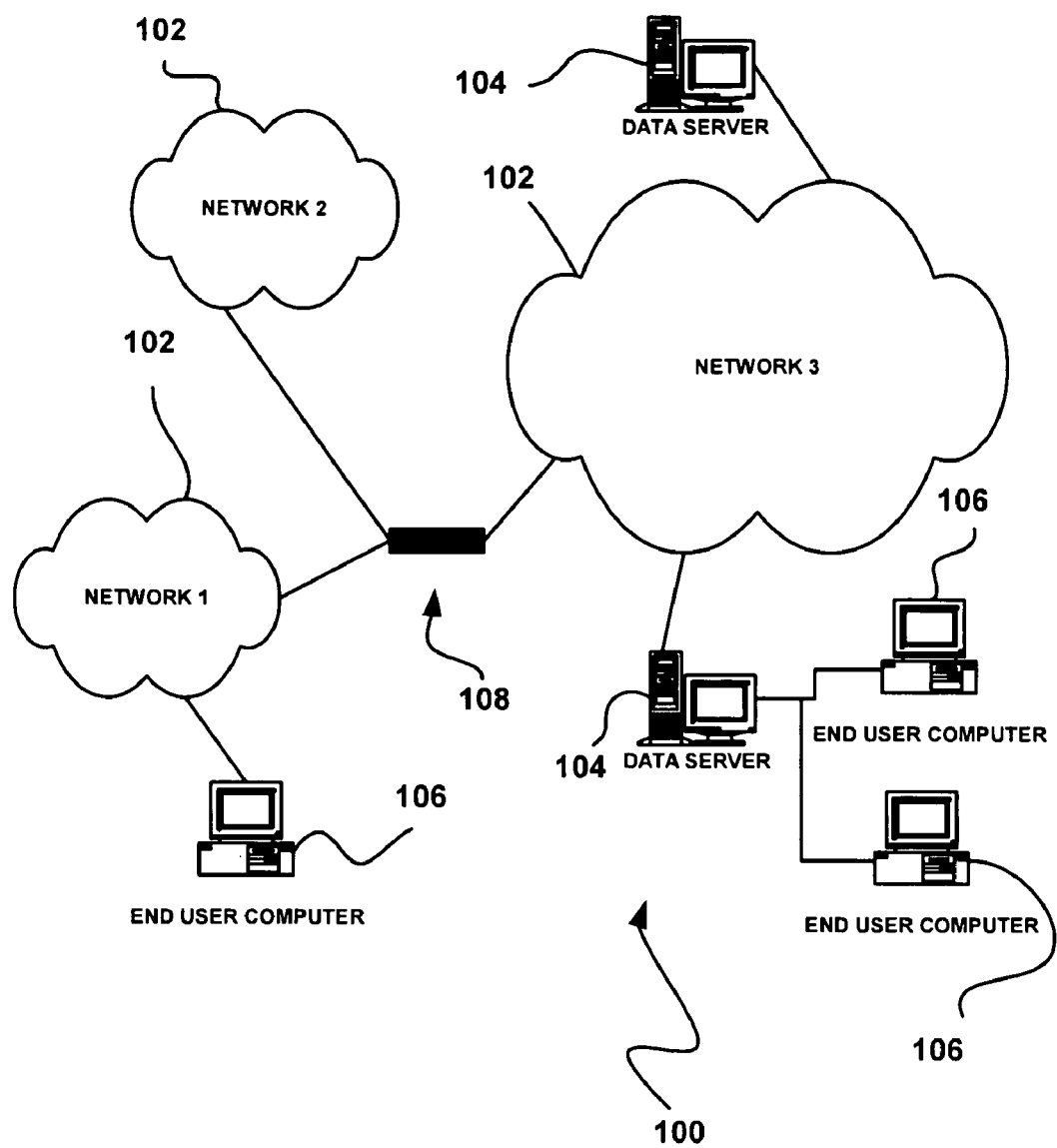
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

It should be noted that each of the foregoing network devices in the present network architecture 100, as well as any other unillustrated hardware and/or software, may be equipped with various security features. For example, the various data server computers 104 and/or end user computers 106 may be equipped with security functionality in the form of a virus scanner, a firewall, etc. for purposes that will be set forth hereinafter in greater detail.

In use, mass-mailing-type malware is prevented from sending electronic messages via a network (i.e. networks 102, etc.). Malware is also prevented from communicating. Still yet, unrecognized attachments are prevented from opening, and executable files are prevented from being infected via the network.

In the context of the present description, malware (i.e. "malicious software") may refer to any programming or files that are developed for the purpose of doing harm to a computer and/or network components. Thus, malware may include, but is not limited to, computer viruses, worms, Trojan horses, etc.

To this end, malware infection is inhibited, at least in part. More information regarding optional functionality and architectural features will now be set forth for illustrative purposes.

Figure 2:
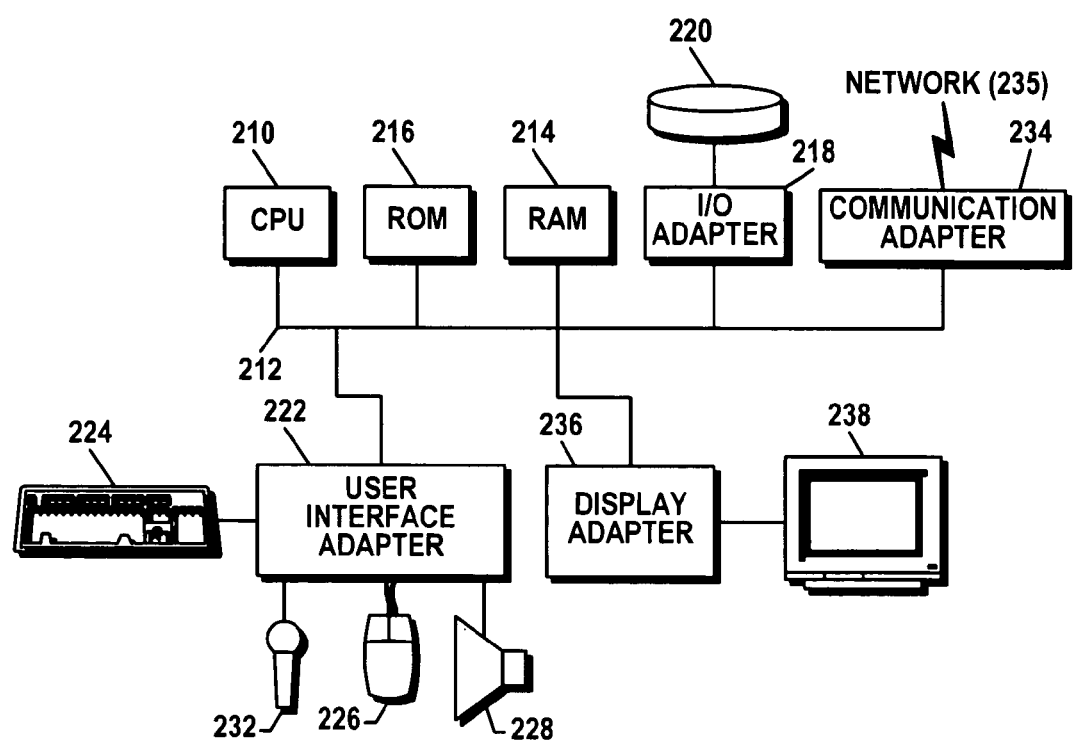
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
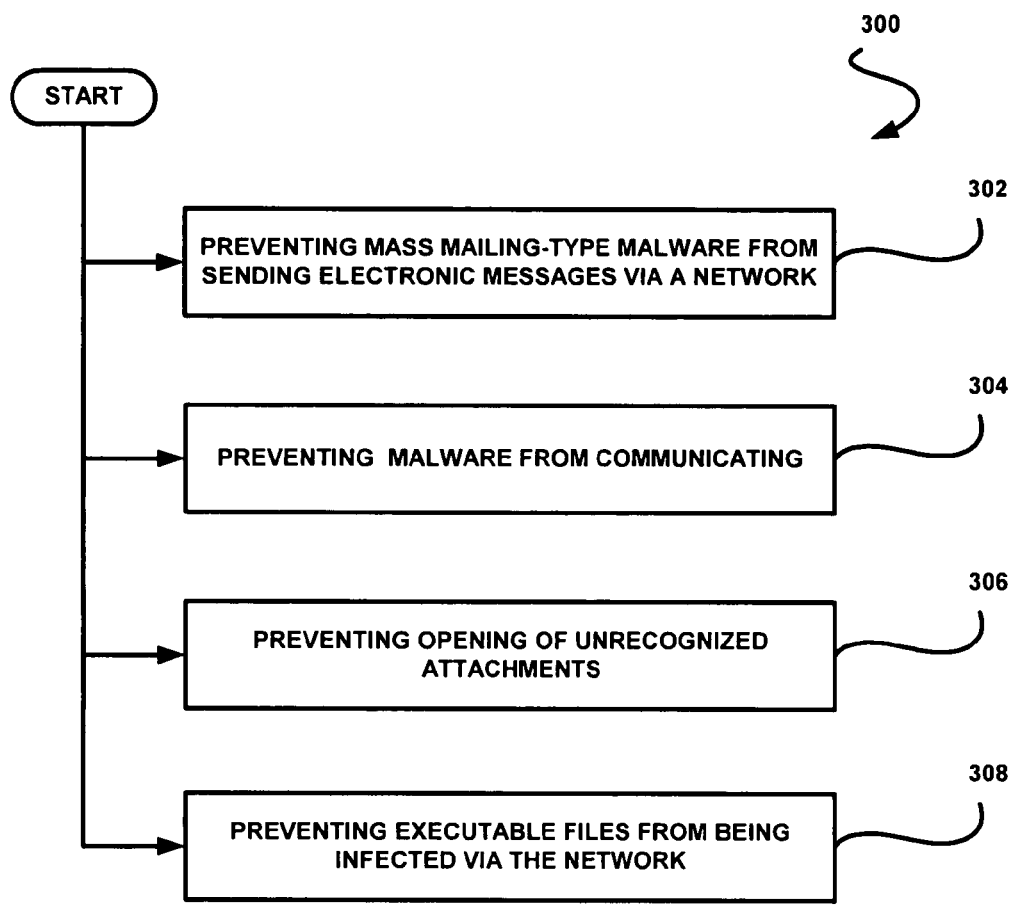
FIG. 3 illustrates a method for preventing malware infection, in accordance with one embodiment.

FIG. 3 illustrates a method 300 for preventing malware infection, in accordance with one embodiment. As an option, the present method 300 may be implemented in the context of the architecture and environment of FIGS. 1 and/or 2. Of course, however, the method 300 may be carried out in any desired environment.

It should be noted that the various operations of the method 300 of FIG. 3 may be carried out utilizing a virus scanner and/or any other desired module. Moreover, it should be noted that the order of the various operation may be interchanged and the operations may be executed in parallel, per the desires of the user.

In operation 302, mass-mailing-type malware is prevented from sending electronic messages via a network. In one embodiment, the mass-mailing-type malware may be capable of sending a multiplicity of electronic messages to a multiplicity of recipients. Further, the mass-mailing-type malware may be prevented from sending electronic messages by preventing use of a predetermined port. This predetermined port may include port 25.

As an option, the mass-mailing-type malware may be prevented from sending electronic messages by utilizing a white list for conditionally preventing the sending of electronic messages based on a predetermined aspect. For example, such a predetermined aspect may include a recipient address or an application identifier.

Some of the most successful recent viruses were those that talked directly with e-mail servers to send themselves to other people. This communication happens on TCP/IP port 25. Thus, by containing a rule which prevents any application from opening port 25, the present embodiment may provide enhanced security. If a virus evades the other rules and is not detected by virus signatures, it may be able to run, but will not be able to spread to any other systems by e-mail.

Because operation 302 will prevent legitimate e-mail clients from sending e-mail, such operation may incorporate the aforementioned white list of known e-mail clients. Sending e-mail is thus limited to a small number of applications that a person uses. In many cases, there may be just one program that is legitimately sending e-mail. This application may further be white listed to prevent false positives.

With reference now to operation 304, the malware is also prevented from communicating. In one embodiment, the malware may be prevented from communicating by preventing communications over predetermined communication channels. Such predetermined communication channels may include, but is not limited to, a file transfer protocol (FTP), a hypertext transfer protocol (HTTP), and/or an internet relay chat (IRC) protocol.

Optionally, the malware may be prevented from communicating by utilizing a white list for conditionally preventing the communicating based on a predetermined aspect. As an example, the predetermined aspect may be an application identifier, etc.

Thus, in one specific aspect of the present embodiment, the present operation prevents viruses and Trojans from communicating. Recent viruses and Trojans have needed to communicate in various ways for various reasons. See, for example, Table 1.

TABLE 1

Some viruses spread in two phases. In the first phase, a small amount of code spreads to a remote system. This code then uses FTP to copy the rest of itself over.
Some viruses and Trojans download other Trojans, adware or spyware using HTTP or FTP.
Some viruses and Trojans inform associated "masters" where they have spread. They also receive instructions from associated masters. One common use for this technique is to set up 'spam networks.' In use, the spammer instructs the infected machines to send spam on his behalf (this cannot be traced back to him). This communication often happens using IRC protocol.

The present operation 304 thus utilizes rules which block the aforementioned communication channels. While a system may still become infected, the virus will be stifled if it cannot communicate. As with operation 302, white lists of applications that are allowed to communicate may be employed.

As an option, there may be a few more applications which use the aforementioned communication channels. For example, someone may be using MS Internet Explorer®, MS Outlook®, and/or MS Windows Media Player®, all of which use HTTP to download content. Thus, the risk of false positives may be higher until the user tunes the rules to his/her environment. Once tuned, however, the triggering of the rules may accurately identify unauthorized downloads.

Still yet, in operation 306, unrecognized attachments are prevented from opening. Optionally, the opening of unrecognized attachments may be prevented by preventing the opening of the unrecognized attachments when residing in a temporary directory.

The prevention of the opening of the unrecognized attachments may further be subject to user tuning. For example, such user tuning may involve limiting the prevention of the opening of the unrecognized attachments to situations where the unrecognized attachments are received via a web page or via an electronic message (i.e. e-mail, etc.).

As an option, operation 306 may work to prevent web browsers and/or e-mail clients from executing unknown attachments. The success of the mass-mailing viruses described above can be attributed to the continuing propensity of people to open attachments that they receive in their mailboxes. Because files have to exist on disk before they can be executed, web browsers and e-mail clients save the attachment to the system or the user "temp" directory and are then launched from there.

Thus, the present operation 306 employs rules which prevent common web browsers, e-mail clients and archive extracting programs from launching executables directly from any "temp" directory. In the context of the present description, a temporary directory is any directory that is temporary in nature or in any related aspect (i.e. either in name or function).

In operation 308, executable files are prevented from being infected via the network. In one embodiment, executable files may be prevented from being infected via the network by determining whether a request to open the executable files is a local request or a remote request. In this embodiment, the executable files may be prevented from being infected by conditionally allowing the opening thereof based on whether the request is the local request or the remote request.

A very successful class of viruses is that which spreads across corporate networks by finding writable shares and infecting executables that they find there. As an option, operation 308 may differentiate between open requests made on behalf of another computer on the network, and thus optimally prevent executable files from being infected over the network. More information regarding such differentiation may be found in the aforementioned related application, which is incorporated herein by reference.

Because of such differentiation, operation 308 can still allow local processes to modify executables which, although sometime suspicious, can occur legitimately (i.e. for example, when operating system patches are applied). In one embodiment, the ability to differentiate between local and network accesses may be used in a way that minimizes false positives, by using various related rules that are tuned to specific directories. See Table 2 for examples of such location-based rules.

TABLE 2

On a workstation: it is legitimate for 'windows update' to update executables. It is not legitimate for anyone on the network to update any executable. A rule is thus provided which "stops network users from changing any executable."
On a fileserver: the comment above about 'windows update' is still true. However, it is okay for users on the network to change some executables (i.e. those in directories that are meant to be shared, etc.). However, it is still not legitimate for user to change executables which belong to the operating system. Rules are provided which enforce this (i.e. "stop network users from changing any executable in the directory <c:\windows> and in subdirectories")

The ability to tune the aforementioned rules to specific processes minimizes false positives. Obviously, a rule which said "don't allow anything to execute anything" would be 100% secure, but would make the computer useless. By limiting behavior blocking to just those operations which are most dangerous (i.e. running programs from e-mails or web pages), one can stop the casual execution of viruses while still allowing all other legitimate programs to run.

Figure 4:
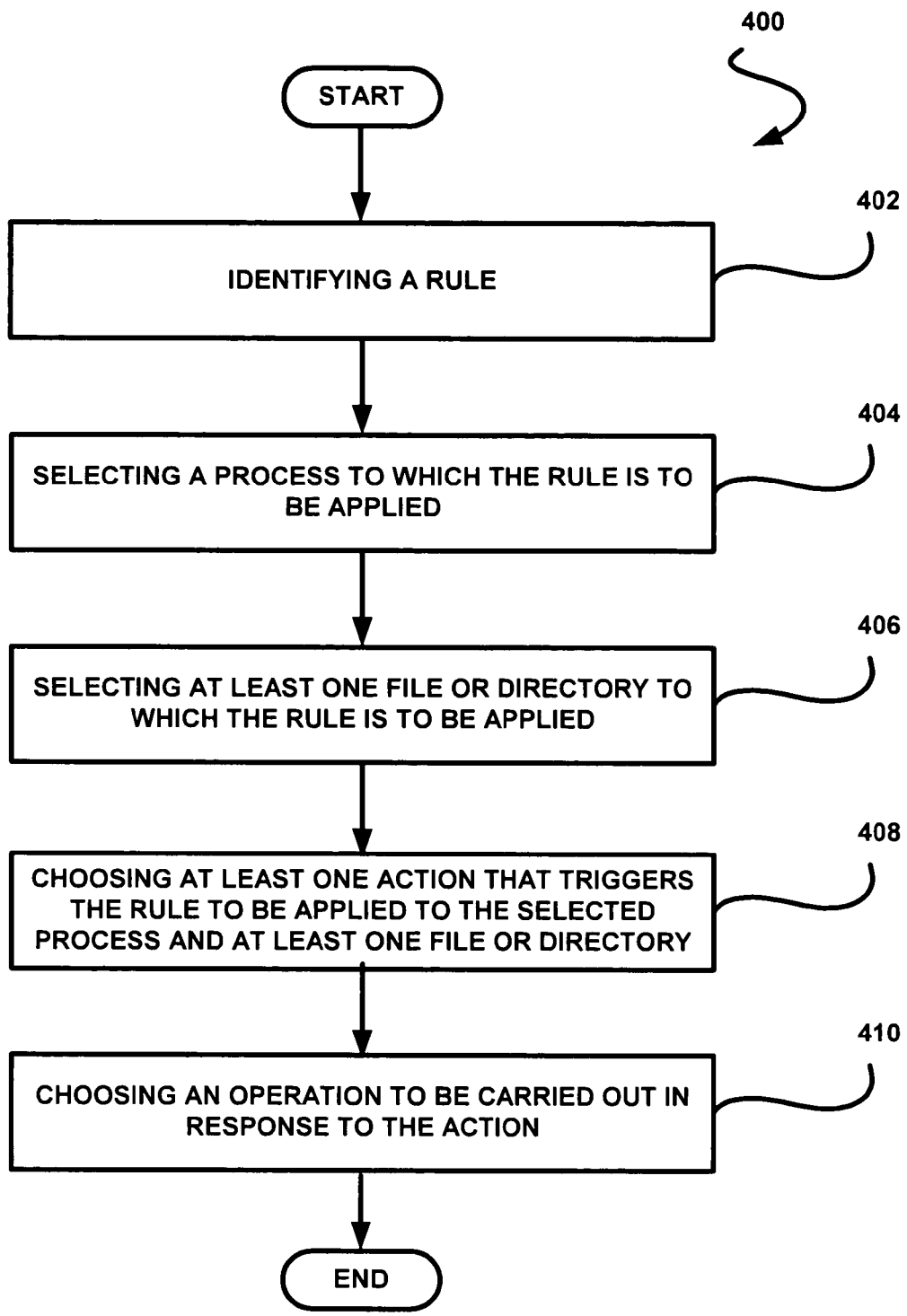
FIG. 4 illustrates a method for defining a rule to prevent malware infection, in accordance with one embodiment.

FIG. 4 illustrates a method 400 for defining a rule to prevent malware infection, in accordance with one embodiment. As an option, the present method 400 may be implemented in the context of the architecture and environment of FIGS. 1 and/or 2, and/or in the definition of the rules of the method 300 of FIG. 3. Of course, however, the method 400 may be carried out in any desired environment.

In operation 402, a rule is identified. This may be accomplished in any desired manner. For example, a pre-existing or new name may be selected by the user to later identify the rule.

Further, in operations 404 and 406, a process and at least one file or directory is selected to which the rule is to be applied. In the context of the present description, such process may include any functionality associated with code (i.e. an application program, etc.), and the file may include any data that may be stored at a certain location in memory (i.e. directory).

Still yet, in operation 408, at least one action is chosen that triggers the rule to be applied to the selected process and the at least one file or directory. Such action may include either user or computer actions. Even still, in operation 410, an operation is chosen to be carried out in response to the action. Such operation may include any response that is desired, in dealing with the aforementioned action for security purposes.

The present method 400 thus allows the definition of a powerful rule-based mechanism that can be used to not only prevent a computer from becoming infected with a virus that traditional virus scanning components cannot detect, but also prevent an already infected computer from spreading the infection further or from becoming damaged.

More information regarding one exemplary graphical user interface will now be set forth, which may optionally be used to implement the foregoing method 400, in the context of an illustrative, non-limiting example.

Figure 5:
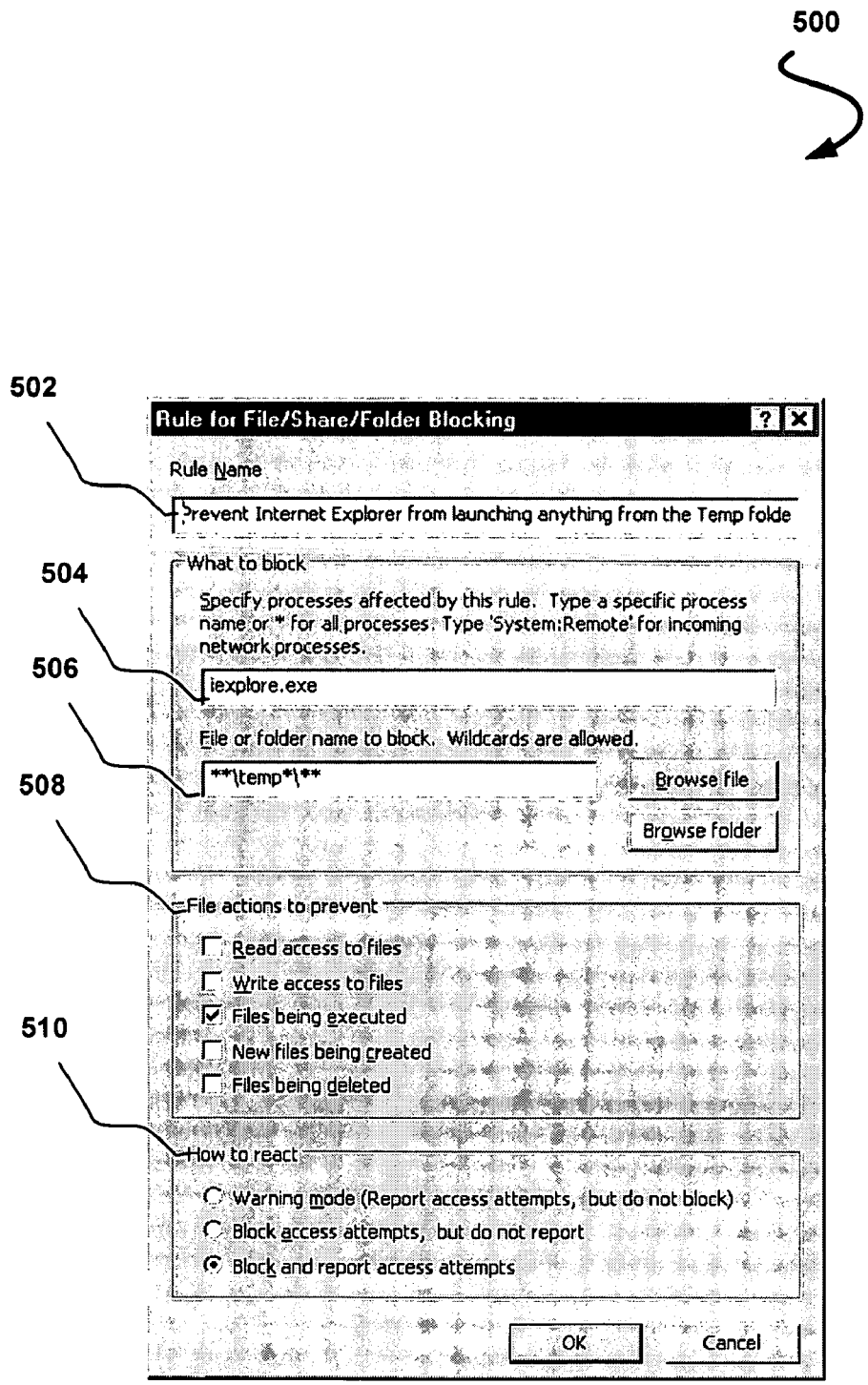
FIG. 5 illustrates an exemplary graphical user interface for defining a rule to prevent malware infection, in accordance with one embodiment.

FIG. 5 illustrates an exemplary graphical user interface 500 for defining a rule to prevent malware infection, in accordance with one embodiment. As an option, the present graphical user interface 500 may be implemented in the context of the architecture and environment of FIGS. 1 and/or 2, and/or in the definition of the rules of the methods 300 and 400 of FIGS. 3 and 4. Of course, however, the graphical user interface 500 may be carried out in any desired environment.

As shown in FIG. 5, a first field 502 associated with the graphical user interface 500 is provided. The first field 502 is adapted for receiving a rule identifier (i.e. see, for example, operation 402, of FIG. 4, etc.).

Thus, in one embodiment, this field may simply be used for entering a descriptive name for the rule. If the rule is broken, the rule name may be included in the logs and events that are generated.

Further shown is a second field 504 associated with the graphical user interface 500. In use, the second field 504 is adapted for receiving a selection of a process to which the rule is to be applied (i.e. see, for example, operation 404, of FIG. 4, etc.).

Thus, the present field includes the name(s) of the processes covered by the rule. This can be a single name or cover more than one process through the use of wildcards. It should be understood that the concept of 'process name' can readily be extended to lists (i.e. 'winword.exe,' 'excel.exe,' etc.), directories (i.e. conceptually "everything installed in c:\program files," etc.), and subdirectories, etc.

Additionally, this feature may optionally be expanded beyond processes, per se, to other entities that can be represented as such (which are intended to fall within the term "processes," in the present context). For example, two pseudo-processes may be utilized: 'System:Remote' which represents file accesses made by the kernel on behalf of clients on the network, and 'System' which represents all other files access made by the kernel. More information regarding such feature may be found in the aforementioned related application, which is incorporated herein by reference.

Still yet, a third field 506 is associated with the graphical user interface 500. The third field 506 is adapted for receiving a selection of at least one file or directory to which the rule is to be applied (i.e. see, for example, operation 406, of FIG. 4, etc.).

This field receives the name of the files and/or directories that are covered by the rule. These are not necessarily files that are 'protected', or even exist. More information regarding this field will be set forth hereinbelow in the context of a couple of examples. As with the process name, the format to specify the names of files may involve a block that could vary between implementations.

With continuing reference to FIG. 5, a fourth field 508 is associated with the graphical user interface 500. The fourth field 506 is adapted for receiving a selection of at least one action that triggers the rule to be applied to the selected process and at least one file or directory (i.e. see, for example, operation 408, of FIG. 4, etc.).

The present actions may be those that trigger the rule if the named process(es) attempts such actions. Of course, numerous actions may be performed on a file. Some actions such as 'write data to the file' cannot occur until another operation (i.e. 'open file for write access') has occurred. Since the present embodiment may be monitoring 'open file for write access,' such embodiment does not need to offer 'write data to the file' as an option to block. Other operations such as 'rename file' are conceptually similar to the ones listed and the present embodiment may hide the distinction. Therefore, the list shown is not a definitive list of operations and other implementations may have variations.

When a file operation is attempted, the present embodiment gathers the name of the process that attempted the operation, the name of the directory/file, and the action that was attempted. This information may then be compared against each rule in turn. If all three pieces of information match, the operation is failed and the present embodiment may log all the pertinent information.

Even still, a fifth field 510 is associated with the graphical user interface 500. The fifth field 510 is adapted for receiving a selection of an operation to be carried out in response to the action (i.e. see, for example, operation 410, of FIG. 4, etc.).

Following are possible examples of use of the graphical user interface 500, which are set forth for illustrative purposes only and should not be construed as limiting in any manner.

Example 1

One has a private file (c:\MyData\CreditCard.xls) that one does not want to share. One can protect this file with the rule:

| Process | : | System:Remote |
| Filename | : | C:\MyData\CreditCard.xls |
| Prevent | : | 'Open for read access' |

Remote is a pseudo process that represents file accesses made on behalf of computers on the network. If someone on the network attempts to open or copy this file, the process, filename and action will match those listed in the rule and the attempt will be denied.

Example 2

One hears of a new virus that spreads using the filename 'virus.exe'. One can prevent this file being created with the rule:

| Process | : | * |
| Filename | : | virus.exe |
| Prevent | : | Create |

In this case, virus.exe is not being protected—the computer is being protected from this file. It does not matter which process attempts to create the file. Any attempt to create it will fail.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by subnational groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing the infection thereof with malware, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
preventing mass-mailing-type malware from sending electronic messages via a network;
preventing malware from communicating;
preventing opening of unrecognized attachments; and
preventing executable files from being infected via the network;
wherein a graphical user interface is utilized, the graphical user interface associated with:
a first field adapted for receiving an identifier of a rule;
a second field adapted for receiving a selection of a process to which the rule is to be applied;
a third field adapted for receiving a selection of at least one file or directory to which the rule is to be applied;
a fourth field adapted for receiving a selection of at least one action that triggers the rule to be applied to the selected process and at least one file or directory; and
a fifth field adapted for receiving a selection of an operation to be carried out in response to the action.

2. The method as recited in claim 1, wherein the mass-mailing-type malware is capable of sending a multiplicity of electronic messages to a multiplicity of recipients.

3. The method as recited in claim 1, wherein the mass-mailing-type malware is prevented from sending the electronic messages by preventing use of a predetermined port.

4. The method as recited in claim 3, wherein the predetermined port includes port 25.

5. The method as recited in claim 4, wherein the preventing of the mass-mailing-type-malware from sending the electronic messages is carried out by preventing use of port 25, which also prevents sending the electronic messages to e-mail servers.

6. The method as recited in claim 1, wherein the mass-mailing-type malware is prevented from sending the electronic messages by utilizing a white list for conditionally preventing the sending of the electronic messages based on a predetermined aspect.

7. The method as recited in claim 6, wherein the predetermined aspect includes a recipient address.

8. The method as recited in claim 6, wherein the predetermined aspect includes an application identifier.

9. The method as recited in claim 8, wherein the application identifier identifies an application that legitimately sends e-mail.

10. The method as recited in claim 1, wherein the malware is prevented from communicating by utilizing a white list for conditionally preventing the communicating based on a predetermined aspect.

11. The method as recited in claim 10, wherein the predetermined aspect includes an application identifier.

12. The method as recited in claim 10, wherein the communication includes code that copies itself using FTP.

13. The method as recited in claim 10, wherein the communication includes downloading at least one of a Trojan, adware and spyware using HTTP.

14. The method as recited in claim 10, wherein the communication includes downloading at least one of a Trojan, adware and spyware using FTP.

15. The method as recited in claim 10, wherein the communication includes informing a source of malware of a location of the malware and receiving instructions from the source to send the malware to other recipients.

16. The method as recited in claim 10, wherein the prevention of communication by the malware stops the malware from spreading to other recipients.

17. The method as recited in claim 1, wherein the opening of unrecognized attachments is prevented by preventing the opening of the unrecognized attachments when residing in a temporary directory.

18. The method as recited in claim 1, wherein the prevention of the opening of the unrecognized attachments is subject to user tuning.

19. The method as recited in claim 18, wherein the user tuning involves limiting the prevention of the opening of the unrecognized attachments to situations where the unrecognized attachments are received via a web page.

20. The method as recited in claim 18, wherein the user tuning involves limiting the prevention of the opening of the unrecognized attachments to situations where the unrecognized attachments are received via an electronic message.

21. The method as recited in claim 1, wherein the executable files are prevented from being infected via the network by determining whether a request to open the executable files is a local request or a remote request.

22. The method as recited in claim 21, wherein the executable files are prevented from being infected by conditionally allowing the opening thereof based on whether the request is the local request or the remote request.

23. The method as recited in claim 22, wherein conditionally allowing the opening of the executable files based on whether the request is the local request or the remote requests utilizes location-based rules.

24. The method as recited in claim 23, wherein the location-based rules include preventing network users from changing executables.

25. The method as recited in claim 23, wherein the location-based rules include preventing network users from changing executables associated with an operating system.

26. The method as recited in claim 21, wherein rules tuned to specific directories are utilized for determining whether the request to open the executable files is the local request or the remote request.

27. The method as recited in claim 1, wherein the method is utilized to counter terrorism.

28. The method as recited in claim 1, wherein the opening of the unrecognized attachments is prevented by preventing web browsers, e-mail clients and archive extracting programs from executing the unrecognized attachments.

29. The method as recited in claim 1, wherein the malware is prevented from communicating by preventing a first component of malware from communicating with a second component of malware, the first component of malware including a virus and the second component of malware including a Trojan.

30. The method as recited in claim 1, wherein the malware is prevented from communicating by preventing communications over predetermined communication channels.

31. The method as recited in claim 30, wherein the communications over the predetermined communication channels are prevented for preventing the malware from at least one of copying an entirety of itself to a device, downloading other malware, and receiving instructions from an associated master.

32. The method as recited in claim 30, wherein the predetermined communication channels include a file transfer protocol (FTP).

33. The method as recited in claim 30, wherein the predetermined communication channels include a hypertext transfer protocol (HTTP).

34. The method as recited in claim 30, wherein the predetermined communication channels include an internet relay chat (IRC) protocol.

35. A computer program product embodied on a computer readable medium, comprising:
    computer code for preventing mass-mailing-type malware from sending electronic messages via a network;
    computer code for preventing malware from communicating;
    computer code for preventing opening of unrecognized attachments; and
    computer code for preventing executable files from being infected via the network;
    wherein the computer program product is operable such that a graphical user interface is utilized, the graphical user interface associated with:
        a first field adapted for receiving an identifier of a rule;
        a second field adapted for receiving a selection of a process to which the rule is to be applied;
        a third field adapted for receiving a selection of at least one file or directory to which the rule is to be applied;
        a fourth field adapted for receiving a selection of at least one action that triggers the rule to be applied to the selected process and at least one file or directory; and
        a fifth field adapted for receiving a selection of an operation to be carried out in response to the action.

36. A graphical user interface system embodied on a computer readable medium for defining a rule to prevent malware infection, comprising:
    a first field associated with a graphical user interface, the first field adapted for receiving an identifier of a rule;
    a second field associated with the graphical user interface, the second field adapted for receiving a selection of a process to which the rule is to be applied;
    a third field associated with the graphical user interface, the third field adapted for receiving a selection of at least one file or directory to which the rule is to be applied;
    a fourth field associated with the graphical user interface, the fourth field adapted for receiving a selection of at least one action that triggers the rule to be applied to the selected process and at least one file or directory; and
    a fifth field associated with the graphical user interface, the fifth field adapted for receiving a selection of an operation to be carried out in response to the action.

37. The method as recited in claim 36, wherein the process involves an application program.

38. The method as recited in claim 36, wherein the action is performed by a user.

39. The method as recited in claim 36, wherein the action is performed by a computer.

40. The method as recited in claim 36, wherein the first field allows a user to enter a descriptive name for the rule.

41. The method as recited in claim 36, wherein the identifier includes a name of the rule.

42. A method for preventing malware infection, comprising:
    preventing mass-mailing-type malware from sending electronic messages via a network by utilizing a white list for conditionally preventing the sending of the electronic messages based on at least one of a recipient address and an application identifier;
    preventing malware from communicating by:
        preventing a first component of malware from communicating with a second component of malware,
        preventing communications over predetermined communication channels including at least one of a file transfer protocol, a hypertext transfer protocol, and an internet relay chat protocol, and
        utilizing a white list for conditionally preventing communication based on an application identifier;
    preventing opening of unrecognized attachments when the attachments reside in a temporary directory;
    preventing executable files from being infected via the network by determining whether a request to open the executable files is a local request or a remote request and conditionally allowing the opening of the executable files based on whether the request is determined to be the local request or the remote request;
    wherein the mass-mailing-type malware is capable of sending a multiplicity of electronic messages to a multiplicity of recipients;
    wherein the prevention of the opening of the unrecognized attachments is limited to situations where the unrecognized attachments are received via at least one of an electronic message and a web page.

* * * * *